United States Patent [19]
Hall

[11] Patent Number: 4,979,321
[45] Date of Patent: Dec. 25, 1990

[54] TREE EXCAVATOR

[76] Inventor: Peter J. Hall, R.R. #1, Kettleby, Ontario, Canada, L0G 1J0

[21] Appl. No.: 468,893

[22] Filed: Jan. 23, 1990

[51] Int. Cl.⁵ .............................................. A01G 23/04
[52] U.S. Cl. ...................................... 37/2 R; 37/103; 37/183 R; 47/76
[58] Field of Search ............. 37/2 R, 2 P, 103, 183 R, 37/184; 47/76

[56] References Cited

U.S. PATENT DOCUMENTS

| | | | |
|---|---|---|---|
| 3,017,719 | 1/1962 | Sigler et al. | 37/2 R X |
| 4,179,847 | 12/1979 | Oster Walder | 37/2 R X |
| 4,351,253 | 9/1982 | Dahlquist | 37/2 R X |
| 4,402,148 | 9/1983 | Schiffelbein | 37/2 R X |
| 4,481,989 | 11/1984 | Peters | 37/2 R X |
| 4,602,444 | 7/1986 | Endo | 37/2 R |
| 4,676,013 | 6/1987 | Endo | 37/2 R |

*Primary Examiner*—Dennis L. Taylor
*Assistant Examiner*—J. Russell McBee
*Attorney, Agent, or Firm*—Fetherstonhaugh & Co.

[57] ABSTRACT

An excavator for excavating a tree and forming a root ball consisting of an excavator scoop having a plurality of segments mounted for movement with respect to one another between a nested position in which the segments are nested one within another and a deployed position in which the segments are extended fron one another and cooperate with one another to form a bowl-shaped scoop. A drive mechanism is provided which serves to drive the segments from the nested position to the deployed position, such that when the nested segments are located adjacent a tree and then driven to the deployed position the segments will pass under the tree to evacavate the tree and form a root ball within the deployed scoop. The excavator is mounted on a crane which is in turn mounted on a truck. The crane serves to manipulate the excavator between a ground contacting position and a load transporting position. In this load transporting position a tree is supported with its root ball in the scoop and its trunk and branches extending toward the back end of the truck.

20 Claims, 11 Drawing Sheets

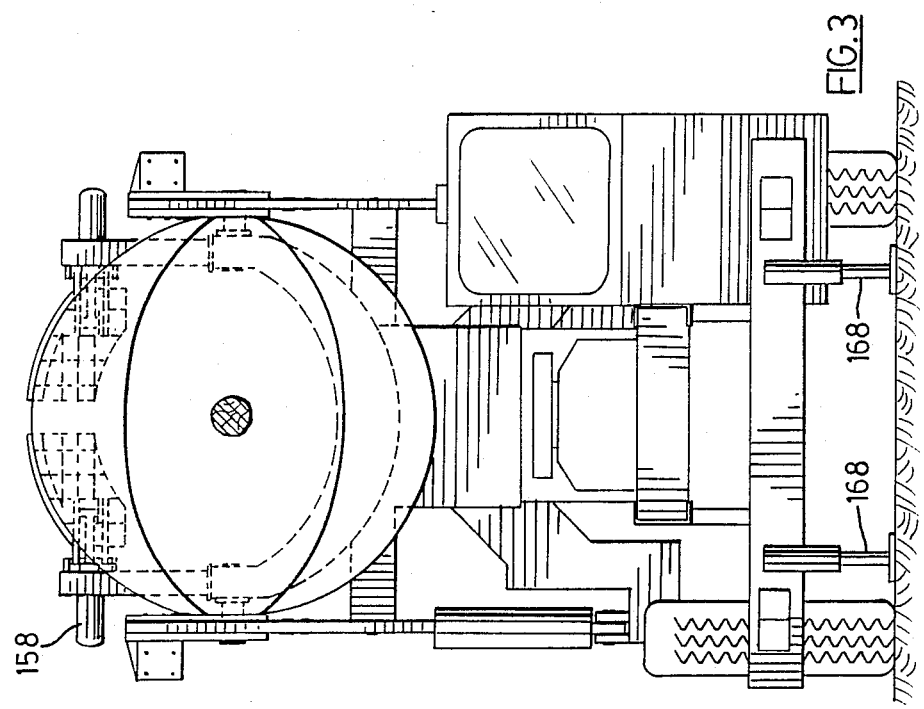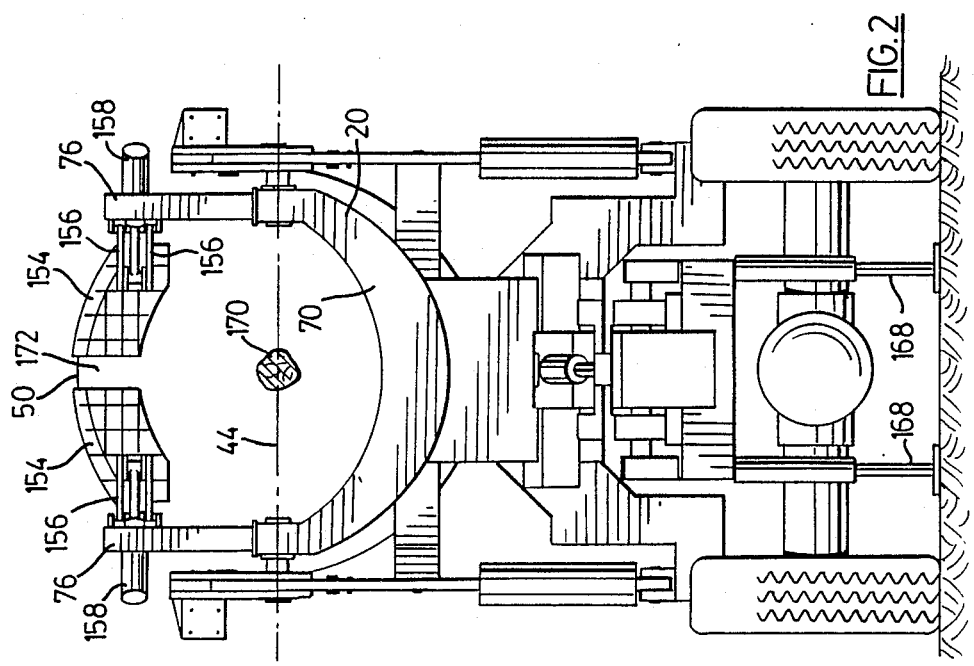

TREE EXCAVATOR

BACKGROUND OF THE INVENTION

This invention relates to excavators for excavating and transplating trees.

A variety of different mechanisms have been developed for excavating trees and forming root balls to permit the trees to be transplanted.

U.S. Pat. No. 3,977,099 Stewart, discloses a digging maching which has a pair of spirical blades mounted for rotation. A parallelogram linkage is provided to effect rotation of the blades. The blades are separately mounted on the parallelogram linkage and are driven in an arcuate path from opposite sides of the tree in order to form the root ball. The mechanism is such that it is necessary for the parallelogram linkage mechanism to penetrate the soil in order to form the root ball and consequently this mechanism is subject to damage resulting from contact with obstacles in the soil.

U.S. Pat. No. 2,770,7076 (check number) Kluckhohn, discloses an excavator which excavates by forming a trench which extends from one side of the tree. As a result, the mechanism does not form a complete root ball, but merely serves to wrench the roots from the soil.

U.S. Pat. No. 2,990,630 discloses a free moving machine in which the excavator is formed in two halves which straddle the tree trunk during the excavation. This patent also discloses a structure in which the tree is transported with the trunk of the tree extending forwardly from the root ball toward the front end of the vehicle.

U.S. Pat. No. 4,045,891 Grew, discloses a structure in which the three blades are provided which serve to dig into the soil at circumferentially spaced intervals around the root ball.

U.S. Pat. No. 3,889,402 discloses an excavator in which two blades are mounted to move toward one another from opposite sides of the plant in order to form the root ball during the excavation operation.

U.S. Pat. No. 3,936,960 discloses a structure in which a plurality of spades are arranged to be driven downwardly into the soil so as to converge below the plant in order to form a root ball. A cutter blade is also provided which will extend under the spades in order to cut the tap root. The problem with this mechanism is that it does not fully support the root ball during the final excavation step of removing the tree.

SUMMARY OF INVENTION

It is an object of the present invention to provide a simple and effective excavator for a tree in which an excavator scoop is provided which can excavate the root ball from one side of the tree but which will form a bowl shaped scoop which will support the root ball during the excavation.

It is a further object of the present invention to provide an excavator scoop which has a plurality of segments which are deployed sequentially during the excavation operation to extend to form a complete bowl shape scoop under the root ball of the tree which is being excavated.

It is a further object of the present invention to provide a motor vehicle which has an articulating crane on which the excavator's scoop is mounted and which can be articulated to locate the scoop at the front end of the vehicle during excavation and to store the scoop and the excavated tree on the vehicle with the trunk of the tree extending from the scoop toward the back end of the motor vehicle so as to minimize wind damage to the tree when the vehicle is driven forwardly to transport the tree from one site to another.

According to one aspect of the present invention an excavator for excavating a tree and forming a root ball comprising: an excavator scoop having a plurality of segments mounted for movement with respect to one another between a nested position in which the segments are nested one within another and a deployed position in which the segments are extended from one another and cooperate with one another to form a bowl-shaped scoop, scoop drive means engaging the scoop and operable to drive the segments from the nested position to the deployed position, such that when the nested segments are located adjacent a tree and then driven to the deployed position the segments will pass under the tree to excavate the tree and form a root ball within the deployed scoop.

According to a further aspect of the present invention there is provided an excavator for excavating a tree and forming a root ball comprising: a motor vehicle having a chassis, an articulating crane mounted on the chassis, said crane having a distal end, an excavation scoop mounted at the distal end of the crane, crane drive means operable to drive the crane between a first position in which the scoop is located forwardly from the motor vehicle in contact with the ground at an excavation site and a second position in which the scoop is elevated above the chassis for supporting a root ball and a tree above the chassis with the trunk of the tree extending from the root ball toward the back end of the motor vehicle.

BRIEF DESCRIPTION OF THE DRAWINGS

FIG. 2 is a back view of the motor vehicle of FIG. 1;

FIG. 3 is a front view of the motor vehicle of FIG. 1;

With reference to FIG. 1 of the drawings, the reference numeral 10 refers generally to a mobile tree excavator constructed in accordance with an embodiment of the present invention. The mobile tree excavator 10 consists of a motor vehicle 12, a crane 14 and a scoop assembly 16. The scoop assembly 16 comprises an excavator scoop 18, a support frame 20 and a scoop drive mechanism 22.

EXCAVATOR SCOOP

Figure 1:
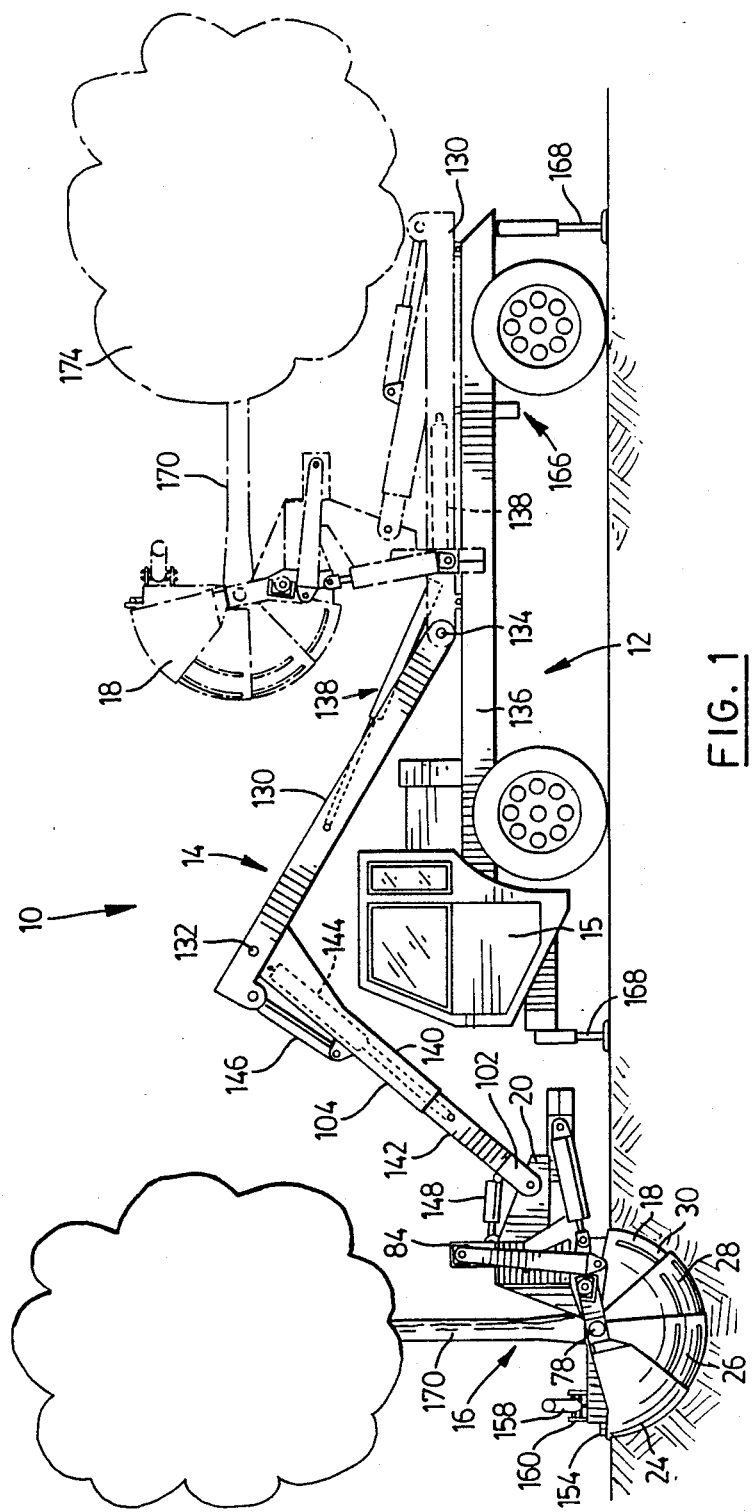
FIG. 1 is a side view of an excavator constructed in accordance with an embodiment of the present invention showing two positions of the excavator scoop relative to the motor vehicle on which it is mounted.

The excavator scoop 18 and a number of its components are illustrated in FIGS. 1, 4, 5, 6, 7 and 8 to which reference is now made.

The excavator scoop 18 comprises a leading segment 24 and first, second and third trailing segments 26, 28 and 30.

The leading segment 24 has a concave blade portion 32 and arms 34 which project forwardly therefrom. The arms 34 each comprise a pair of spaced parallel plates 36 which are held in a spaced relationship by means of spacers 38 and 40. A bore 42 extends through each of the arms 34 and has a center line 44 which forms the axis of rotation of the leading segment 24 and the trailing segments 26, 28 and 30. A plurality of catch pins 46 are located adjacent and project inwardly from the trailing edge 48 of the leading segment 24 as most clearly shown in FIG. 8.

Figure 8:
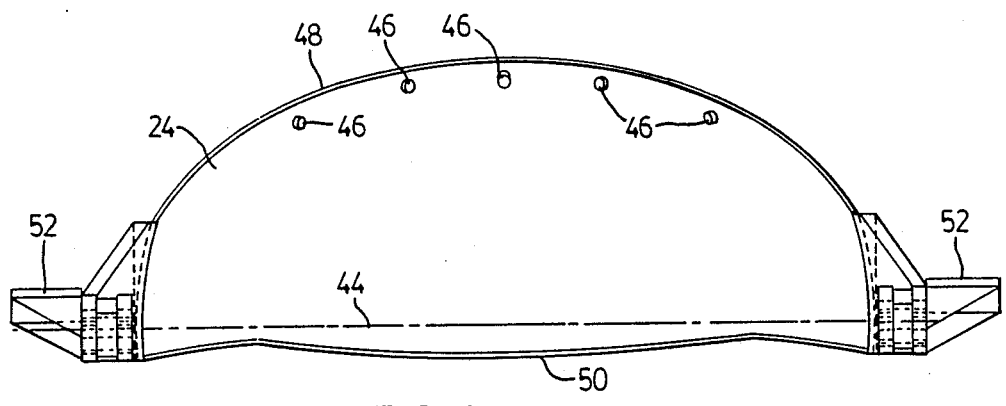
FIG. 8 is a front view of the leading segment of FIG. 7.

The leading edge 50 of the blade portion 32 is profiled as shown in FIG. 8 to facilitate soil penetration.

Brackets 52 are mounted on each of the arms 34 and serve to support a vibration inducing mechanism which will serve to impart a vibrating action to the blade 32 to facilitate soil penetration in use.

Figure 4:
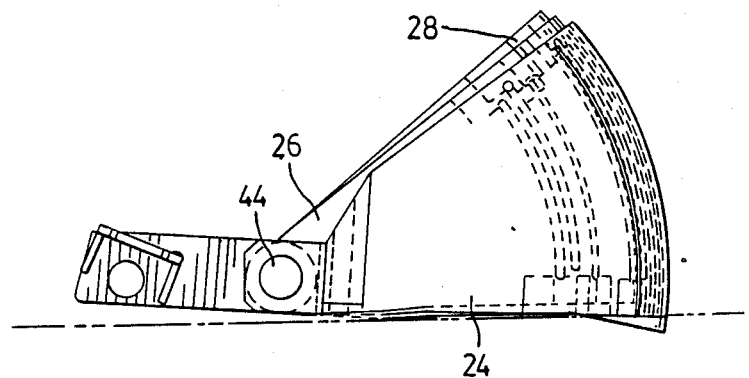
FIG. 4 is a side view of the excavator scoop in the closed position.
Figure 5:
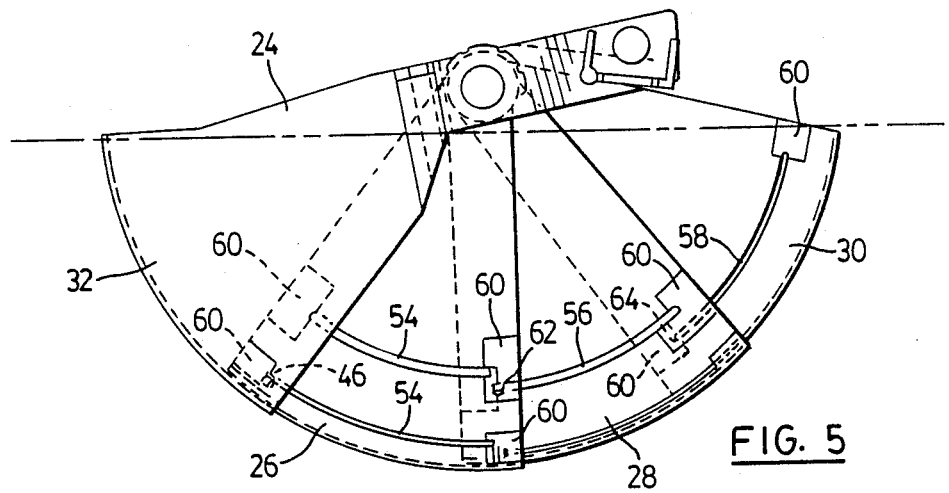
FIG. 5 is a side view of the excavator scoop in the deployed position.
Figure 6:
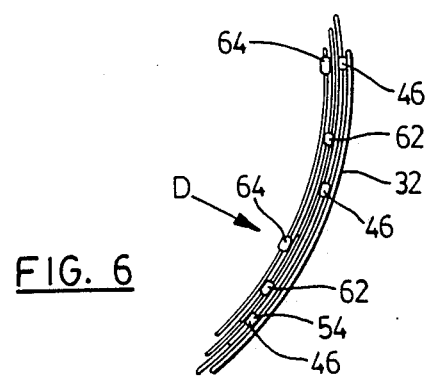
FIG. 6 is a sectional view of a portion of the nested scoop.
Figure 7:
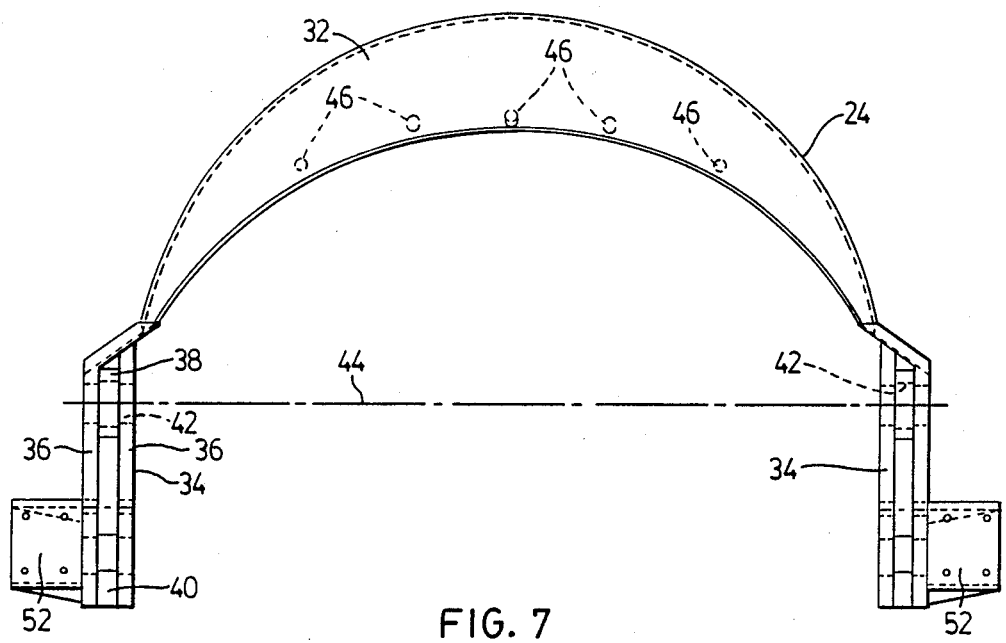
FIG. 7 is a plan view of the leading segment of the scoop.

As shown in FIG. 5 of the drawings, the second, third and fourth trailing segments 26, 28 and 30 have slots 54, 56 and 58 respectively formed therein. Keeper plates 60 are located at each end of the slots 54, 56 and 58. The catch pins 46 of the leading segment project into the slots 54 and are proportioned to be free to slide along the slots 54. Similarly, catch pins 62 extend inwardly from the first trailing segment 26 into the slots 56 of the second trailing segment and catch pins 64 project inwardly from the second trailing segment into the slots 58 of the third trailing segment. Thus, it will be seen that when the leading segment 24 is pivoted from the nested position illustrated in FIG. 4 to the deployed position shown in FIG. 5 the leading segment will be free to rotate relative to the first, second and third trailing segments until the catch pins 46 engage the keeper plates 60. Thereafter the leading segment will draw the first trailing segment with it and this procedure will be repeated with the second and third trailing segments such that the segments will be sequentially deployed from the nested position to the deployed position shown in FIG. 5. As a result it is only necessary to drive the leading segment. The major portion of the loads required to excavate the root ball will be borne by the leading segment and consequently it is advantageous to apply the scoop drive mechanism directly to the leading segment 24.

Figure 9:
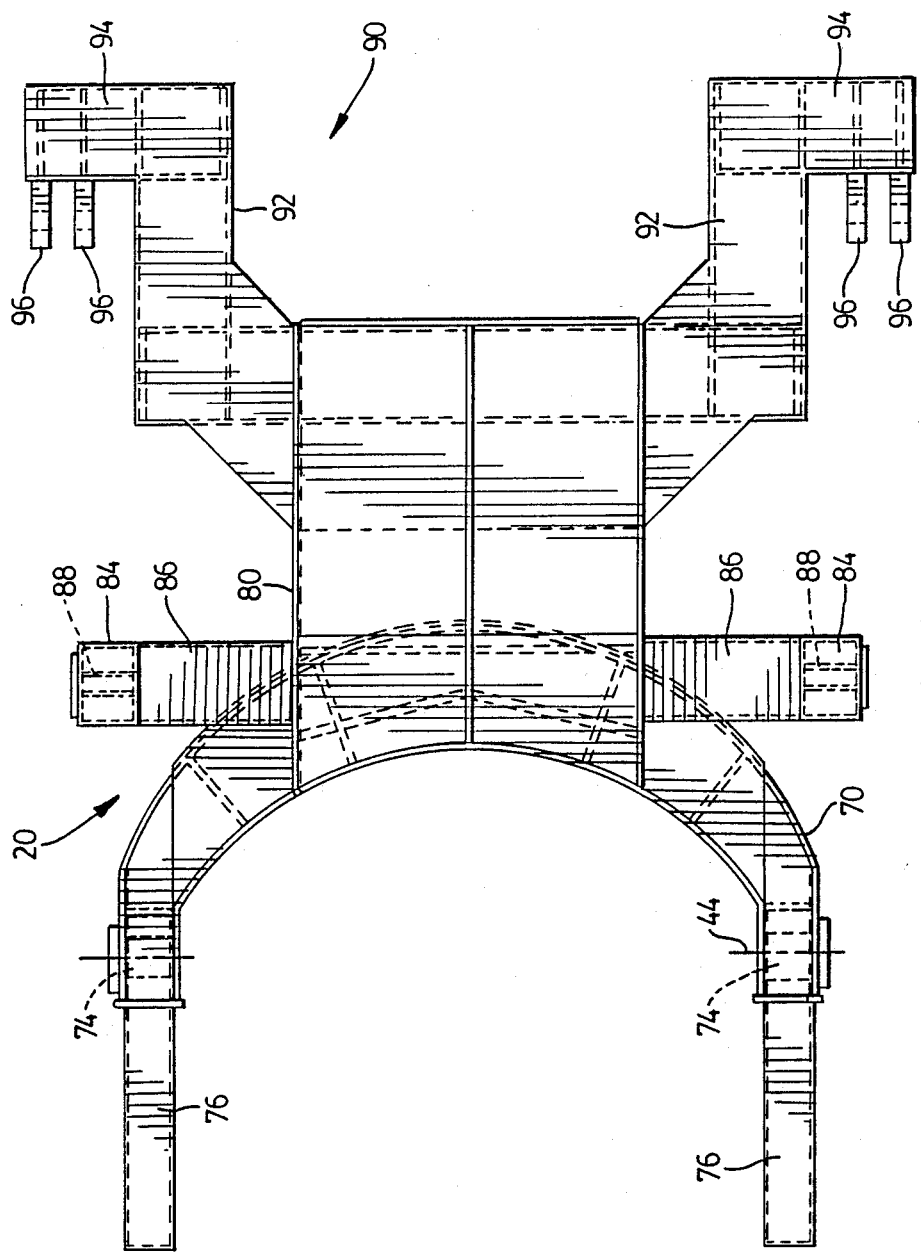
FIG. 9 is a plan view of the scoop support frame.
Figure 10:
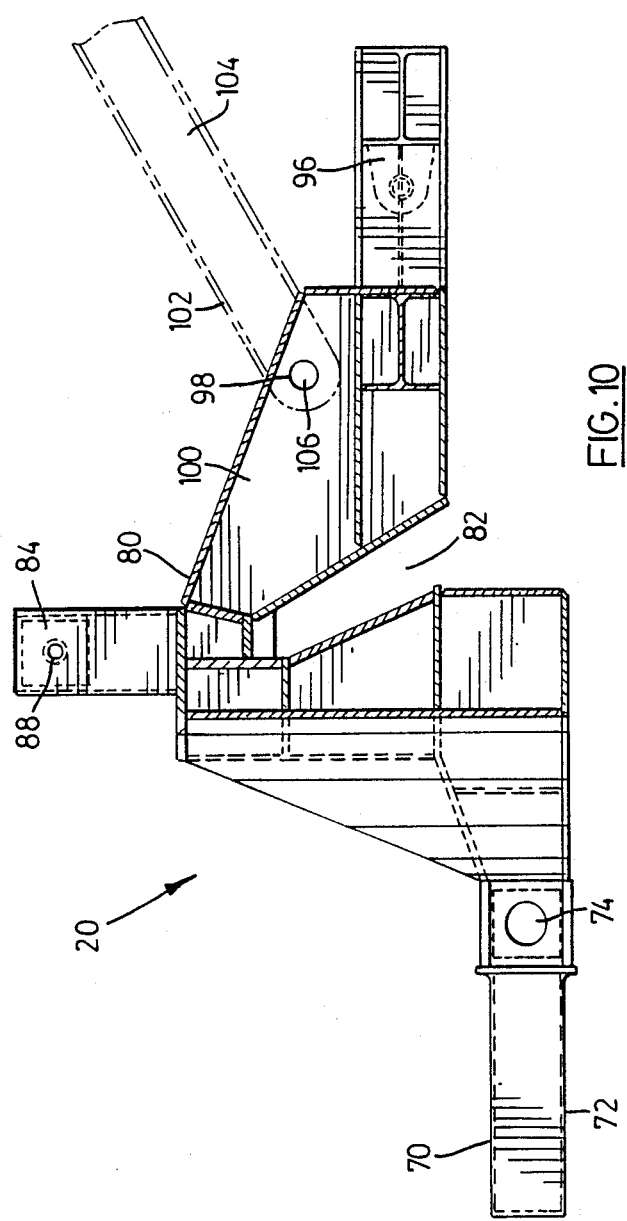
FIG. 10 is a side view of the scoop support frame of FIG. 9.

The support frame 20 is illustrated in FIGS. 9 and 10 of the drawings to which reference is now made.

The support frame 20 has a generally U-shaped front end portion 70 which has a lower ground engaging surface 72. Passages 74 are formed adjacent the inner ends of the arms 76. The passages 74 serve to support the pivot pin 78 (FIG. 1) which serve to pivotally mount the scoop segments on the frame 20 for rotation about the axis 44. The frame 20 also has a central portion 80 which extends above the front end portion 70 and is formed with a recess 82 which serves to accommodate the scoop segments when they are in the nested configuration. The central portion 82 also has a pair of support posts 84 which project upwardly from arms 86 and support posts 84 each have a passage 88 which opens laterally therethrough. The support posts 84 serve to support one end of a link arm of the scoop drive mechanism as will be described hereinafter with reference to FIG. 11.

The frame 20 also has a back end portion 90 which has a pair of lugs 92 each of which has a laterally extending portion 94 at the back end thereof on which lugs 96 are mounted. The lugs 96 serve to support a component of the scoop drive mechanism as will be described hereinafter.

A passage 98 is formed in the side walls 100 of the frame and the distal end 102 of the arm 104 of the crane 14 is pivotally attached to the frame 12 by means of a pivot pin 106 which extends through the passages 98.

Figure 11:
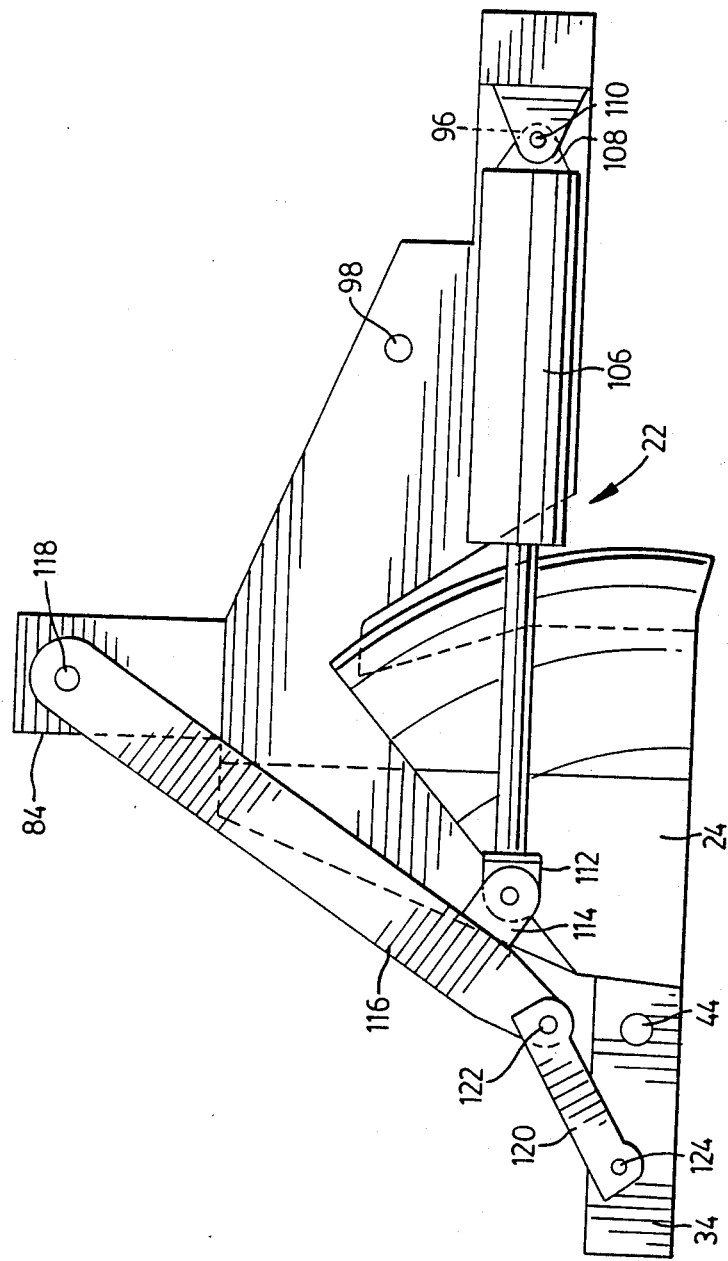
FIG.11 is a side view of the leading scoop segment and the scoop support frame which serves to illustrate the scoop drive mechanism.

As shown in FIG. 11 of the drawing, the drive mechanism 22 comprises a pair of extensible rams 106 which have their back end 108 connected to the lugs 96 of the frame 20 by means of a pivot pin 110. The front end 112 of each ram 106 is pivotally connected to lugs 114 which are mounted on a first link arm 116. Each link arm 116 has its upper end pivotally connected to the support posts 84 by means of a pivot pin 118 which passes through the passage 88 formed in the support posts 84. The second link arm 120 has one end pivotally connected by means of a pivot pin 122 to the lower end of the first arm 116. The other end of the second link arm 120 is pivotally connected by means of a pivot pin 124 to an arm 34 of the leading segment 24 of the scoop.

In use when the ram 22 (?) is in the extended position it serves to locate the segments of the scoop in the nested configuration illustrated in FIG. 4 of the drawings. When the ram is retracted from the extended position it serves to cause the leading segment to pivot about the axis 44 so that it is caused to move from the position shown in FIG. 4 to the position shown in FIG. 5 to sequentially deploy the segments of the scoop.

As shown in FIG. 1 of the drawings, the crane 14 has an inner arm 130 and an outer arm 104 pivotally connected to one another by means of a pivot pin 132. The proximal end of the inner arm 130 is connected by means of a pivot pin 134 to a crane base which is secured to the chassis 136 of the motor vehicle 12. The crane 14 has a first extensible ram 138 which extends between the arm 130 and the base of the crane and is operable to cause the arm 130 to pivot from the deployed position in which it extends forwardly from the pivot pin 132 the stowed position in which it extends parallel to the chassis. The second arm 104 has an upper section 140 within which a lower section 142 is mounted to telescope. An extensible ram 144 extends between the upper and lower portions and is extensible to cause the arm 104 to be extended and is retractable to cause the arm 104 to be contracted.

An extensible ram 146 extends between the distal end of the arm 130 and the centre of the length of the upper section 140 of the arm 104. A fourth set of extensible rams 148 extends between the distal end of the arm 142 and the posts 84 of the frame. The arms 148 are extendible and retractible to cause the frame 20 to pivot about the axis of the pivot pins 150 which serve to connect the distal end of the arm to the frame through the passages 98.

As shown in FIG. 2 of the drawings, a pair of hold-down plates 154 are pivotally mounted by means of link arms 156 to the outer end of each of the arm 76 of the front end portion 70 of the frame 20. Extensible rams 158 are pivotally mounted on the lugs 160 to which the link arms 156 are also pivotally connected. By extending the rams 158 the hold-down plates 154 can be located in the position shown in FIG. 2 in which these plates extend in an arc along a peripheral portion of the leading edge 50 of the leading segments of the scoop. The hold-down plates 154 serve to bear against the soil to prevent excessive heaving of the soil when the leading edge of the scoop is driven through the soil to form the root ball. The hold-down plates 154 can be pivoted so as to extend perpendicularly from their position shown in FIG. 2 so that a wide clearance is provided at the entry to the frame when the frame is to be manipulated into a position in which it extends around the tree.

To facilitate the early stages of the raising of the crane from the stowed position shown in FIG. 1 a pop-up extensible ram 166 is provided which may be extended to raise the arm 130 of the crane to a sufficient extent to enable the ram 138 to operate to coplete the deployment of the crane from the stowed position to the deployed position. In addition, it will be noted that the motor vehicle is fitted with stabilizing legs 168 which bear against the ground and serve to stabilize the vehicle during the excavation and manipulation of the tree.

In use, the scoop will initially be located in its nested position. The crane is deployed to locate the frame on the ground in close proximity to the trunk 170 of a tree so that the trunk 170 is positioned substantially in line with the axis 44 and centrally between the arms 76. The crane 14 and its extensible rams are deployed to retain the lower ground engaging surface 72 of the frame in a position resting on the ground. The legs 168 of the motor vehicle are then deployed to stabilize the vehicle. The scoop drive mechanism 22 is then activated to drive the scoop from the stowed position to the deployed position shown in FIG. 1 thereby to cause the segments of the scoop to be sequentially deployed so that the leading segment will pass under the tree and form a root ball 172. The hold-down plates 154 will serve to prevent break-up of the root ball as the leading segment 24 emerges from the soil.

With the hold-down plates remaining in their deployed position the crane is then articulated to assume the position shown in FIG. 1 in which the scoop 18 is located above the chassis substantially centrally between the wheel sets. In this position the tree branches 174 project rearwardly from the vehicle. The stabilizing legs 168 can then be raised and the vehicle can be driven along the roadway. It will be noted that as the vehicle is driven along the roadway the scoop 18 will form a streamlined wind deflector which will serve to streamline the load and reduce wind damage to the tree. In addition, because the branches are located rearwardly from the trunk the branches will tend to bend away from the root ball and in so doing in most trees they are less likely to be damaged as a result of the bending caused by the wind as the vehicle is driven along the roadway.

From the foregoing, it will be apparent that, in order to excavate a tree using the excavator of the present invention, it is only necessary to gain access to one side of the tree. This is in contrast to the conventional structures which use blades which are driven firmly into the soil on four sides of the tree. As a result, it is possible to use the excavator scoop of the present invention in a restricted area where only limited access to the tree which is to be excavated is available.

In addition, it will be noted that when a vehicle is driven along a highway with the scoop of the present invention arranged in a stowed configuration, the convex curvature of the scoop will be directed toward the front end of the vehicle and will serve to streamline the structure. This is in sharp contrast to existing shovel structures which, when stowed in an unused configuration, open toward the front end of the vehicle and as a result they tend to act as a wind break and greatly increase the fuel consumption of the vehicle in use.

A further embodiment of the present invention is illustrated in FIGS. 12 to 16, to which reference is now made. Like reference numerals apply to like parts to those appearing in the preceding FIGS. 1 to 11.

In the embodiment of the invention illustrated in FIGS. 12 to 15, the catch pins 46, 62, 64 and slots 54, 56 and 58 have been replaced by catch pins 246, 262, 264 and notches 254, 256, 258 respectively. The catch pin 246 is mounted on and projects from the arm 234 which is an extension of the leaning segment 224. The trailing segments 224, 226 and 230 each have arm portions 226a, 228a and 230a in which the notches 254, 256, 258 are formed respectively.

Figure 14:
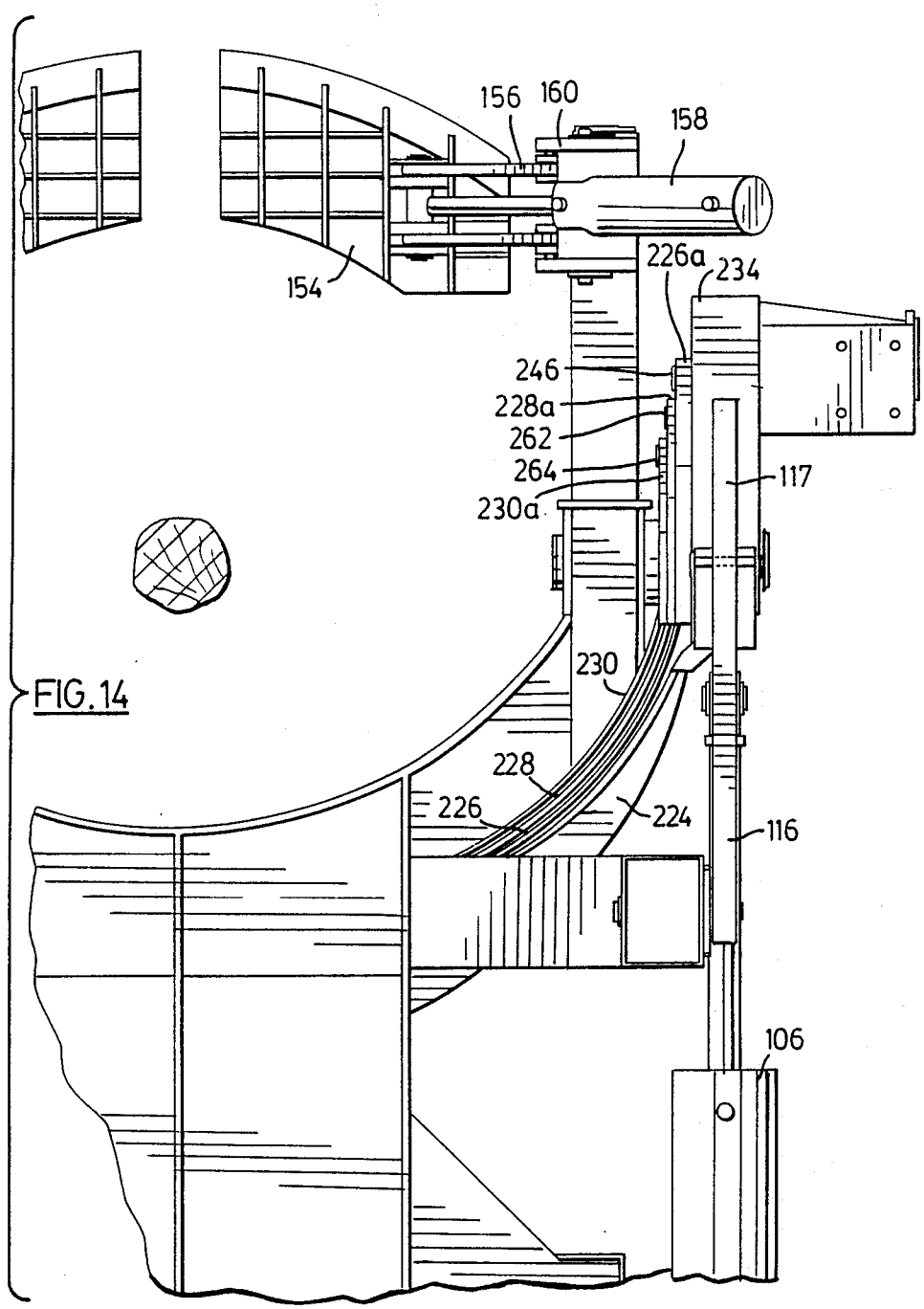
FIG. 14 is a partial plan view of the scoop assembly and support frame of the second embodiment.
Figure 16:
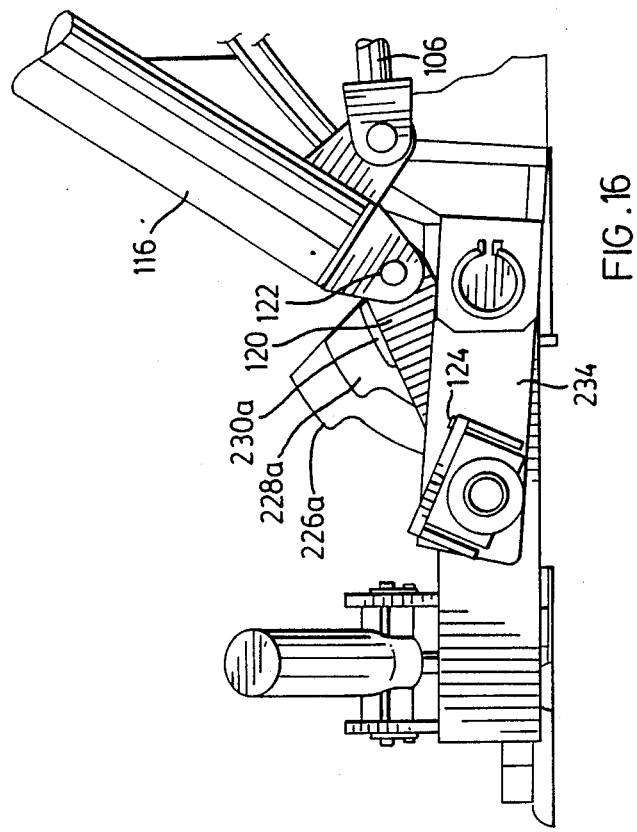
FIG. 16 is a side view of the mechanism illustrated in FIG. 15.
Figure 15:
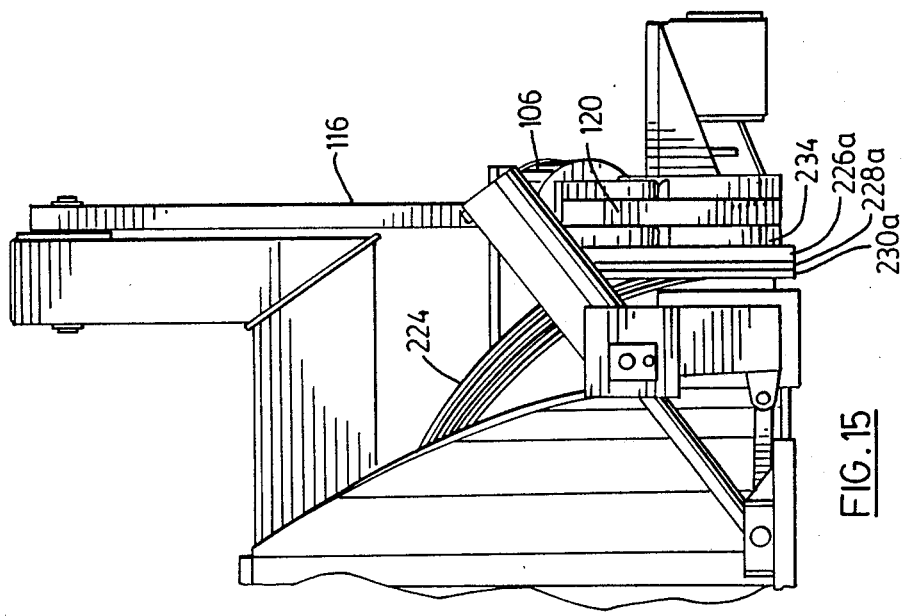
FIG. 15 is a front view of a portion of the mechanism illustrated in FIG. 14.

As shown in FIGS. 14 and 16 of the drawings, the extensible ram 106 is connected to the first link arm 116. The first link arm 116 is connected to the second link arm 120 by means of the pivot pin 122. Similarly, the second link arm 120 is connected to the arm 234 by means of the pivot pin 124. It will be understood that, while FIG. 14 illustrates the deployment mechanism at one side of the scoop assembly, a similar deployment mechanism of the opposite hand is located at the other side of the scoop assembly, only one being shown to simplify illustration.

Figure 12:
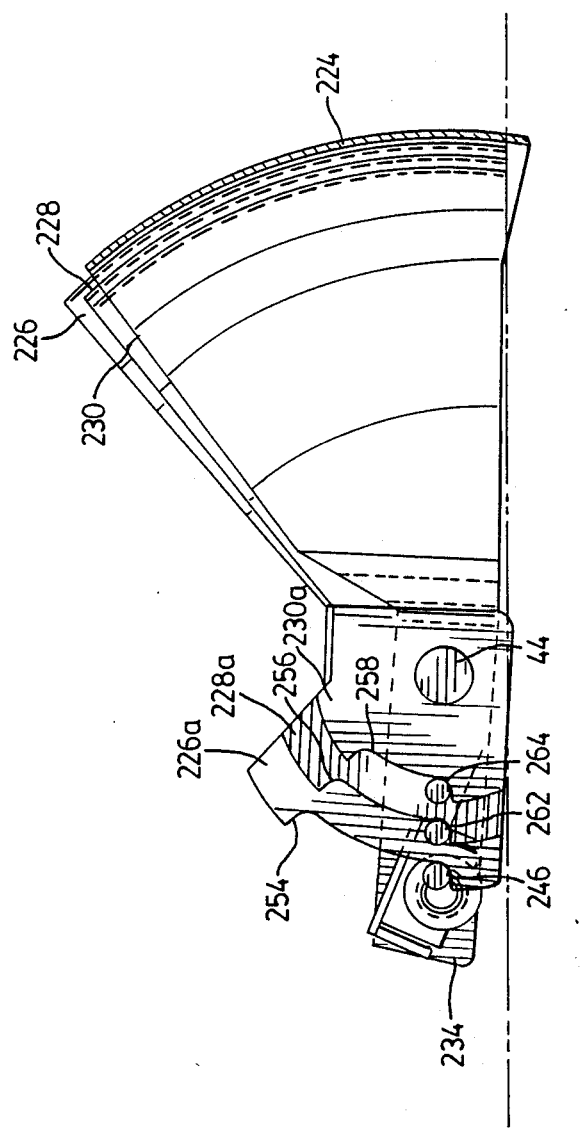
FIG. 12 is a side view of a scoop assembly constructed in accordance with a further embodiment of the present invention showing the segments in the nested configuration.
Figure 13:
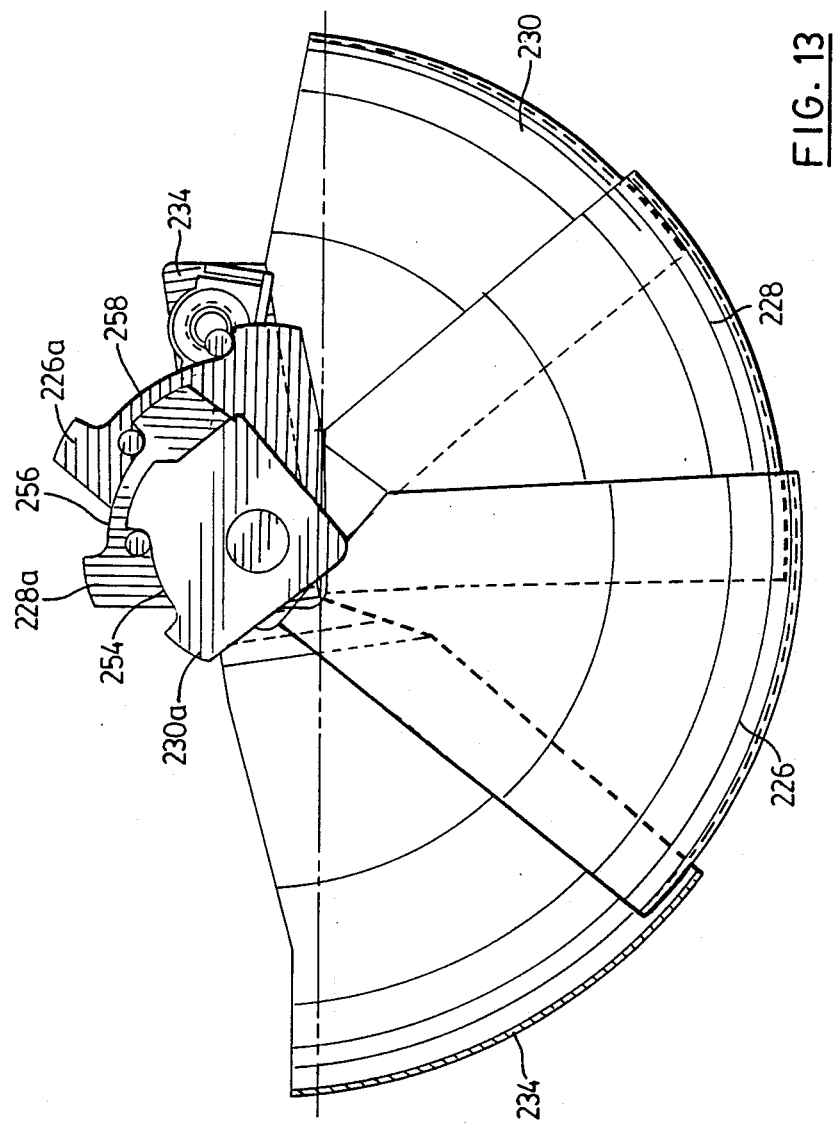
FIG. 13 is a side view similar to FIG. 12 showing the segments in the deployed configuration.

In use, in order to deploy the scoop segments from the nested position shown in FIG. 12 to the deployed position shown in FIG. 13, it is merely necessary to activate the extensible ram 106 as previously described. As a result, the leading segment 224 will be driven about the pivot pin 44 and will serve to penetrate the soil. During this initial movement of the leading segment 224, the catch pin 246 is driven along the notch 254 until it reaches the end of the notch 254. Thereafter continued deployment of the leading segment 224 will result in movement of the arm 226a which will in turn cause the first trailing segment 226 to be deployed. This procedure will be repeated sequentially until all of the segments are fully deployed to the position shown in FIG. 13.

The structure illustrated in FIGS. 12 through 15 has the advantage that the mechanism which controls the sequential deployment, namely the catch pins and the notches, is not submerged during the excavation and will not ever be operating in a hostile environment.

These and other modifications of the invention will be apparent to those skilled in the art.

From the foregoing it will be apparent that the present invention provides an excavator for excavating a tree which permits the formation of a complete root ball and which provides for the stabilizing of the root ball as it is removed and transported in use.

I claim:

1. An excavator for excavating a tree and forming a root ball comprising:
   (a) an excavator scoop having a plurality of segments mounted for movement with respect to one another between a nested position in which the segments are nested one within another and a deployed position in which the segments are extended from one another and cooperate with one another to form a bowl-shaped scoop,
   (b) scoop drive means engaging the scoop and operable to drive the segments from the nested position to the deployed position, such that when the nested segments are located adjacent a tree and then driven to the deployed position the segments will pass under the tree to excavate the tree and form a root ball within the deployed scoop.

2. An excavator as claimed in claim 1 wherein the segments comprise a leading segment and a plurality of trailing segments and coupling means connecting each segment to the segment within which it is nested, said scoop drive means engaging said leading segment whereby the leading segment is the first segment to be deployed during excavation use and thereafter successive trailing segments are deployed in sequence until the scoop is fully deployed.

3. An excavator as claimed in claim 2 wherein the leading segment is the outermost segment of the scoop when the segments of the scoop are nested.

4. An excavator as claimed in claim 3 wherein the segments are mounted to pivot about a common transverse axis.

5. An excavator as claimed in claim 4 wherein the leading segment has arms which project forwardly therefrom and extend across the transverse axis, said scoop drive means being connected to said arms.

6. An excavator as claimed in claim 1 further comprising a support frame for supporting said scoop for pivotal movement between the nested and deployed positions, said scoop drive means interconnecting said support frame and said scoop.

7. An excavator as claimed in claim 6 wherein said frame has a pair of arms projecting forwardly therefrom in a spaced relationship to form a tree trunk accommodating recess therebetween, said arms extending between opposite ends of the scoop in close proximity thereto and wherein pivot means connects the opposite ends of the segments to the adjacent arm of the frame to support the scoop for pivotal movement.

8. An excavator as claimed in claim 1 further comprising a frame for supporting the scoop, said frame having a bifurcated front end in which a recess is formed to accommodate a trunk of a tree, said scoop being pivotally mounted on said frame at opposite sides of said recess.

9. An excavator as claimed in claim 8 wherein the frame has a lower ground contacting face which bears against the ground during excavation use of the scoop, said segments occupying a space located above the lower ground contacting face when in said nested position.

10. An excavator as claimed in claim 8 wherein said scoop drive means comprises extensible ram means having a first end connected to said frame and a second end connected to the scoop, said ram means being extensible to deploy and retractable to nest the segments of the scoop.

11. An excavator as claimed in claim 10 wherein the scoop drive means further comprises linkage means comprising first and second links each having first and second ends, said first ends being pivotally connected to one another, the second end of the first link being pivotally connected to the frame and the second end of the second link being pivotally connected to the scoop, said second end of said ram being connected to said first link, said linkage means serving to translate the reciprocating movement of said ram into pivotal movement of said segments of the scoop in use.

12. An excavator as claimed in claim 8 wherein the bifurcated front end of the frame has a lower ground contacting face which bears against the surface of the root ball and serves to maintain the integrety of the root ball during the excavation and subsequent transportation of the root ball.

13. An excavator as claimed in claim 12 wherein the bifurcated front end of the frame has forwardly projecting arms arranged one on either side of the recess, each arm having an outer end, a hold-down plate pivotally mounted on each arm and drive means for driving the pivot plate to and fro between a raised position extending upwardly from its associated arm of the frame and a lower position overlying a peripheral portion of the root ball to form a back stop for the leading segment of the scoop as it approaches the deployed position to maintain the integrity of the root ball.

14. An excavator as claimed in claim 1 further comprising vibrator means mounted on said scoop and operable to impart vibrations to the segments of the scoop to facilitate soil penetration during the deployment of the scoop.

15. An excavator as claimed in claim 1 further comprising:
   (a) a motor vehicle having a chassis,
   (b) an articulating crane mounted on the chassis, said crane having a distal end,
   (c) a frame for supporting said scoop, said frame being mounted at the distal end of said crane,
   (d) crane drive means operable to engage and drive the crane so that it articulates between a first position in which the distal end locates the frame and excavator scoop in contact with the ground at an excavation site and a second position in which the frame are elevated above the chassis for transportation by the motor vehicle.

16. An excavator as claimed in claim 15 wherein the scoop has an open end when in the deployed position and wherein the motor vehicle has a front end and a back end, said second position of said crane serving to locate the scoop with the open end thereof opening toward the back end of the motor vehicle such that when the motor vehicle is driven forwardly, with the crane in said second position, to transport a tree which has its root ball retained in the scoop the trunk of the tree will extend toward the back end of the vehicle and the scoop will function as a wind break and will serve to reduce wind damage to the branches of the tree during transportation.

17. An excavator as claimed in claim 16 wherein said first position of the crane serves to locate the distal end of the crane forwardly from the front end of the vehicle and the crane drive means is operable to drive the distal end from the first position to the second position along an arc of curvature which extends over the front end of the motor vehicle.

18. An excavator as claimed in claim 16 wherein the motor vehicle has a driver's cabin at the front end thereof from which a driver can manipulate the vehicle and crane to position the scoop at an excavation site and activate the scoop to excavate the root ball.

19. An excavator for excavating a tree and forming a root ball comprising:
  (a) a motor vehicle having a chassis,
  (b) an articulating crane mounted on the chassis, said crane having a distal end,
  (c) an excavation scoop mounted at the distal end of the crane,
  (d) crane drive means operable to drive the crane between a first position in which the scoop is located forwardly from the motor vehicle in contact with the ground at an excavation site and a second position in which the scoop is elevated above the chassis for supporting a root ball and a tree above the chassis with the trunk of the tree extending from the root ball toward the back end of the motor vehicle.

20. An excavator as claimed in claim 4, wherein each segment has a lever arm projecting therefrom across said transverse access and wherein said coupling means comprises:
  complimentary detent and slipways on adjacent lever arms, each detent extending into an adjacent slipway, each slipway having stop means at opposite ends thereof limiting the movement of a detent therealong, said detents and slipways permitting movement of one segment relative to another during movement of the segments toward and away from the deployed position to sequentially deploy the segments as aforesaid.

* * * * *